Sept. 5, 1950 R. C. LAWRENCE 2,521,123
APPARATUS FOR FORMING AND IDENTIFYING ARTICLES
Filed Nov. 28, 1947 2 Sheets-Sheet 1

INVENTOR
R.C. LAWRENCE
BY
ATTORNEY

Sept. 5, 1950  R. C. LAWRENCE  2,521,123
APPARATUS FOR FORMING AND IDENTIFYING ARTICLES
Filed Nov. 28, 1947  2 Sheets-Sheet 2

INVENTOR
R.C. LAWRENCE
BY
ATTORNEY

Patented Sept. 5, 1950

2,521,123

UNITED STATES PATENT OFFICE 2,521,123

APPARATUS FOR FORMING AND IDENTIFYING ARTICLES

Roger C. Lawrence, Ridgewood, N. J., assignor to Western Electric Company, Incorporated, New York, N. Y., a corporation of New York Application November 28, 1947, Serial No. 788,345

4 Claims. (Cl. 18—13)

This invention relates to apparatus for forming and identifying articles and has for an object thereof the provision of new and improved apparatus for forming and identifying articles.

A further object of the invention is to provide new and improved apparatus for forming and identifying insulated conductors.

An apparatus illustrating certain features of the invention comprises means for forming plastic material of one color into a filamentary article, and means for embedding a quantity of a plastic material of another color in the filamentary article.

A complete understanding of the invention may be obtained from the following detailed description of an apparatus forming a specific embodiment thereof, when read in conjunction with the appended drawings, in which.

Figure 1:
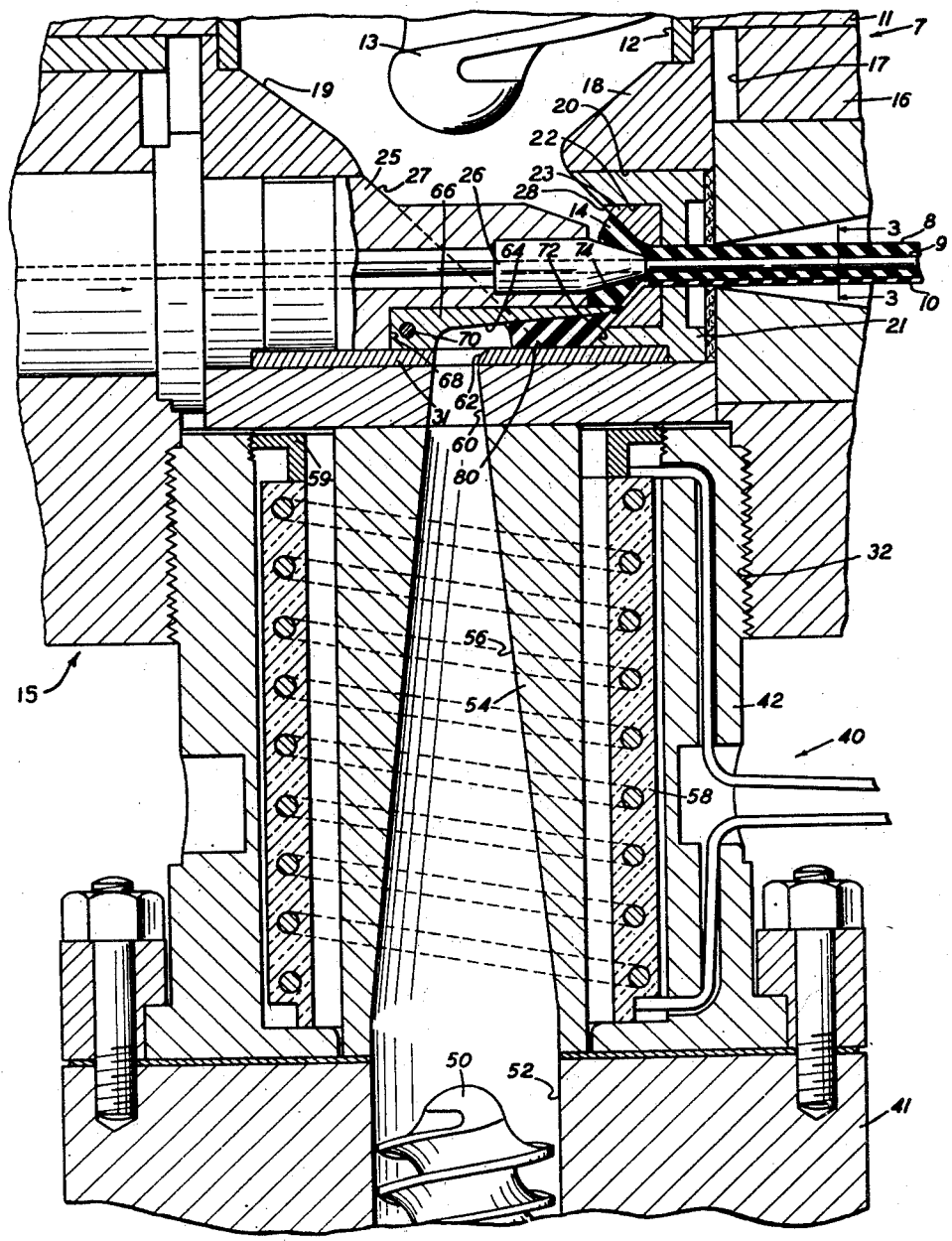
Fig. 1 is a fragmentary, horizontal section of an apparatus forming one embodiment of the invention.

Referring now in detail to the drawings, there is shown therein a continuous extruding apparatus 7 designed to apply a covering 8 of plastic material, such as a vulcanizable compound including rubber or a synthetic rubber-like material, upon a filamentary conductor 9, which may be bare or covered with a textile or plastic covering, and to embed a line-like identifying plastic stripe 10 of material of another color in the covering 8 as the covering is formed over the conductor 9.

The extruding apparatus 7 includes an extruding cylinder 11 having a bore 12 formed therein, in which an extruding screw 13 is rotatably mounted. The extruding screw is rotated by suitable driving means, such as an electric motor (not shown), to force plastic material 14 of a predetermined color through an extruding head 15 under high pressure. The extruding head 15 includes a body member 16 having a bore 17 in which a tool holder 18 is slidably mounted. The tool holder abuts an end of the extrusion cylinder 11 and is provided with a tapered opening 19 which forms a continuation of the bore 12 and communicates with an extrusion passage 20 therein. An annular die holder 21 mounted in the exit end of the extrusion passage 20 in the tool holder 18 has a counterbore 22 formed therein in which a forming die 23 is mounted.

The conductor 9 is advanced toward the right, as viewed in Fig. 1, by suitable conductor advancing means, such as a capstan (not shown), through a core tube holder 25 and a core tube 26. The core tube holder 25 is provided with an inclined surface 27 for deflecting the plastic material 14 toward the die 23, which is provided with a tapered portion 28. An aligning plate 31 bolted to the tool holder 18 maintains the die holder 21 and the core tube holder 25, and thereby the core tube 26 and the die 23, aligned with each other in the extrusion passage 20. A threaded portion 32 is provided in the bore 17 in the body member 16 of the extrusion head 15, and the tool holder carrying the die holder 21, the die 23, the core tube holder 25, the core tube 26 and the aligning plate 31 may be inserted into the bore 17 or removed therefrom.

An auxiliary extruder 40 includes an auxiliary extrusion cylinder 41 and a connecting sleeve 42 clamped to the cylinder 41. The sleeve 42 is designed to be threaded into the threaded portion 32 in the extruding head 15 to secure the auxiliary extruder in extruding position in the head 15. A small stock screw 50 is mounted rotatably in a bore 52 formed in the cylinder 41, and is driven by a suitable source of power, such as an electric motor (not shown). A bushing 54 having a tapered passage 56 therein is mounted in the connecting sleeve 42 between the body member 16 and the cylinder 41, and is heated by an electrical heating element 58 mounted in the sleeve 42. A plug 59 screwed into the sleeve 42 holds the heating element in the sleeve.

Figure 2:
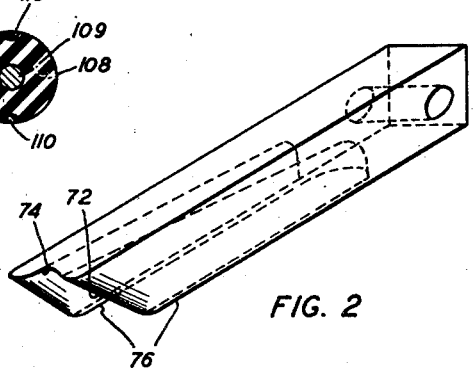
Fig. 2 is an enlarged, perspective view of a portion of the apparatus shown in Fig. 1.

The passage 56 in the bushing 54 connects the bore 52 to an opening 60 formed in the tool holder 18. The opening 60 connects the passage 56 to an opening 62 formed in the aligning plate 31. The opening in the aligning plate 31 connects the opening 60 to a groove 64 formed in a flow guide 66. The flow guide 66 is mounted in a slot 68 formed in the core tube holder 25, and is secured therein by a pin 70. An end portion 72 of the flow guide 66 fits tightly against the die holder 21 and the die 23 and is provided with a generally semi-cylindrical notch 74. Edge portions 76—76 (Fig. 2) of the flow guide 66 abut the aligning plate 31 so that a passage is formed by the groove 64 in the flow guide 66. The notch 74 in the flow guide cooperates with the die 23 to form an outlet for the passage formed by the groove 64.

Operation

In the operation of the apparatus described hereinabove, the conductor 9 (Fig. 1) is advanced through the extruding head 15 and the plastic material 14, which is colored, is formed into the covering 8 thereover. As the plastic material 14 is formed into the covering 8 over the conductor 9, plastic material 80 of a different color is forced by the extrusion screw 50 through the bore 52 in the cylinder 41, the bore 56 in the bushing 54, wherein the plastic material is kept hot, the opening 60 in the tool holder 18, the opening 62 in the aligning plate 31, the groove 64 and the notch 74 in the flow guide 66, and along the face of the die 23 to form the identifying stripe 10 embedded in the outer portion of the covering 8. Since the material 80 has a color different from that of the covering 8, the stripe 10 forms an identifying mark thereon, which is very durable and practically impossible to obliterate. The depth or width of the stripe 10 may be regulated as desired by changing the depth or width of the opening 74 in the flow guide 66.

Figure 4:
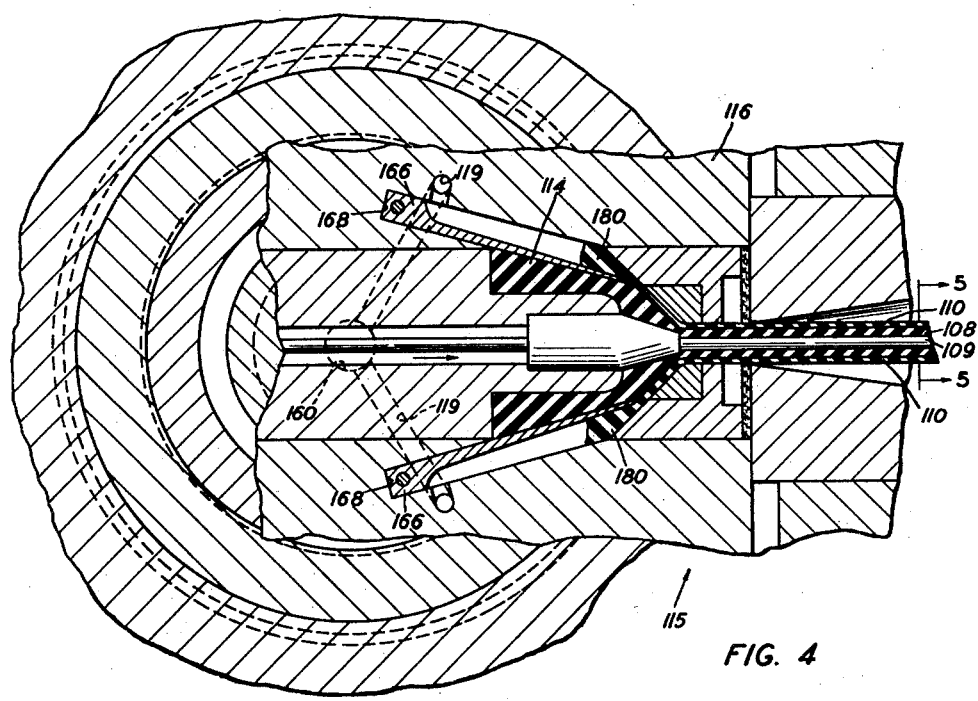
Fig. 4 is a fragmentary, vertical section of portions of an apparatus forming a further embodiment of the invention.
Figure 3:
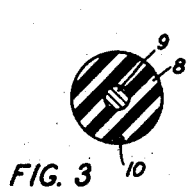
Fig. 3 is a vertical section taken along line 3—3 of Fig. 1.
Figure 5:
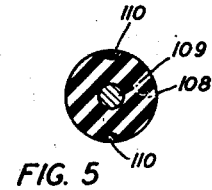
Fig. 5 is a vertical section taken along line 5—5 of Fig. 4.

An apparatus forming an alternative embodiment of the invention is shown in Fig. 4. This apparatus is identical in construction with that shown in Figs. 1 and 2 except that a body portion 118 of an extruding head 115 is provided with diverging passages 119—119 leading from an opening 160 therein and two flow guides 166—166 are provided. The flow guides 166—166 are fixed in sockets 168—168 formed 180° apart in the body portion 118.

Operation

In the operation of this alternative apparatus, a conductor 109 is advanced from left to right, as viewed in Fig. 4, and plastic material 114 of a given color is extruded into an insulating covering 108 therearound. Plastic material 180 of a color different from that of the material 114 is forced through the opening 160, the passages 119—119 and the flow guides 166—166 into peripheral portions of the material 114. The material 180 is formed into two identifying stripes 110—110 embedded in the covering 108 and spaced around the covering 180° from one another. This apparatus serves to form the two identifying stripes 110—110 on opposite sides of the covering so that even if one of the stripes is obscured from vision by the position of the covered conductor, the other stripe will be visible.

What is claimed is:

1. An apparatus for forming and identifying articles, which comprises an extruding head having an opening therethrough and also being provided with an extrusion passage extending substantially perpendicularly from the opening, an extrusion cylinder mounted at one end of the opening, an extruding screw for forcing plastic material of a predetermined color from the cylinder into the opening in the extrusion head, a die mounted in the extrusion passage, a second extrusion cylinder mounted at the other side of the head, an extruding screw for forcing plastic material of a second color into the passage, and a flow guide having a groove therein mounted in the passage in such a manner that the groove abuts the wall of the passage for directing the last-mentioned plastic material toward the die.

2. An apparatus for forming and identifying covered conductors, which comprises an extruding head having an extrusion passage therein, a forming die mounted in the extrusion passage, a core guide mounted in the extrusion passage in alignment with the die for guiding a conductor advanced through the die, means for forcing plastic material of a predetermined color into the passage to force it through the die, whereby the die forms the material into a covering over the conductor, a nozzle positioned off-center in the passage in the extruding head and directed toward the die, and means for forcing plastic material of a color different from that of the first-mentioned plastic material through the nozzle to embed a stripe of the second-mentioned plastic material in the first-mentioned plastic material.

3. An apparatus for forming and identifying articles, which comprises an extruding head having an internally threaded opening therein and also being provided with an extrusion passage extending substantially perpendicularly from the opening, means for forcing plastic material of a predetermined color through the passage, a die mounted in one end of the extrusion passage for forming material forced therethrough, an extrusion cylinder having a threaded end screwed into the threaded opening in the head, means for forcing plastic material of a second color into the opening, and a nozzle connecting said opening and said passage and directed generally toward the die for embedding the second-mentioned plastic material in the first-mentioned plastic material.

4. An apparatus for forming and identifying articles, which comprises an extruding head having an opening therethrough and also being provided with an extrusion passage extending substantially perpendicularly from the opening, an extrusion cylinder mounted at one end of the opening, means for forcing plastic material of a predetermined color from the cylinder into the opening in the extrusion head, a plurality of extruding tools including a die mounted in the extrusion passage and removable therefrom through the other end of the opening, means for deflecting the plastic material toward the die, a second extrusion cylinder mounted at the other end of the opening for securing the extruding tools in the extrusion passage, means for forcing plastic material of a second color through the second extrusion cylinder into the opening, and a flow guide having a groove therein mounted in the opening with the groove abutting the wall of the passage for directing the last-mentioned plastic material toward the die.

ROGER C. LAWRENCE.

REFERENCES CITED

The following references are of record in the file of this patent:

UNITED STATES PATENTS

| Number | Name | Date |
|---|---|---|
| 253,822 | Mignon | Feb. 14, 1882 |
| 380,610 | Van Gestel | Apr. 3, 1888 |
| 817,080 | Mahoney | Apr. 3, 1906 |
| 1,356,891 | Steinle | Oct. 26, 1920 |